United States Patent
Seo et al.

(10) Patent No.: US 9,852,674 B2
(45) Date of Patent: Dec. 26, 2017

(54) DEMULTIPLEXER AND DISPLAY DEVICE INCLUDING THE SAME

(71) Applicant: SAMSUNG DISPLAY CO., LTD., Yongin-si, Gyeonggi-do (KR)

(72) Inventors: Young Wan Seo, Yongin-si (KR); Jong Hee Kim, Yongin-si (KR); Ji Sun Kim, Yongin-si (KR); Jae Keun Lim, Yongin-si (KR); Chong Chul Chai, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 89 days.

(21) Appl. No.: 14/952,590

(22) Filed: Nov. 25, 2015

(65) Prior Publication Data

US 2016/0293093 A1 Oct. 6, 2016

(30) Foreign Application Priority Data

Mar. 30, 2015 (KR) ........................ 10-2015-0044487

(51) Int. Cl.
  *G09G 3/36* (2006.01)
  *G09G 3/20* (2006.01)
  *H02M 3/07* (2006.01)

(52) U.S. Cl.
  CPC ....... *G09G 3/20* (2013.01); *G09G 2310/0264* (2013.01); *G09G 2310/0267* (2013.01); *G09G 2310/0275* (2013.01); *G09G 2310/0297* (2013.01); *H02M 3/073* (2013.01)

(58) Field of Classification Search
  CPC ... G09G 2310/0275; G09G 2310/0267; G09G 2310/0264; H02M 3/073

USPC ......................................................... 345/100
See application file for complete search history.

(56) References Cited

U.S. PATENT DOCUMENTS

| 5,943,271 | A | * | 8/1999 | Fujita | ...................... | G11O 5/146 |
| | | | | | | 327/534 |
| 5,982,223 | A | * | 11/1999 | Park | ...................... | H02M 3/073 |
| | | | | | | 327/536 |
| 6,736,474 | B1 | * | 5/2004 | Tiede | ...................... | H02M 3/073 |
| | | | | | | 327/536 |
| 2003/0006955 | A1 | | 1/2003 | Tsuchi | | |
| 2006/0044251 | A1 | | 3/2006 | Kato et al. | | |
| 2008/0079480 | A1 | * | 4/2008 | Utsunomiya | ......... | H02M 3/073 |
| | | | | | | 327/536 |
| 2009/0122035 | A1 | | 5/2009 | Ito | | |

(Continued)

FOREIGN PATENT DOCUMENTS

| KR | 2002-0059222 A | 7/2002 |
| KR | 10-2006-0124085 A | 12/2006 |
| KR | 10-2009-0048321 A | 5/2009 |

*Primary Examiner* — Yuzhen Shen
(74) *Attorney, Agent, or Firm* — Lewis Roca Rothgerber Christie LLP (57) ABSTRACT

A demultiplexer includes: a first transistor connected between a data input terminal and a first output terminal; a second transistor connected between the data input terminal and a second output terminal; and a first pre-charge circuit connected to a gate electrode of the first transistor, the first pre-charge circuit including: a third transistor and a first diode connected between a first clock input terminal and the gate electrode of the first transistor in parallel; and a first capacitor connected between a second clock input terminal and the gate electrode of the first transistor.

11 Claims, 5 Drawing Sheets

(56) References Cited

U.S. PATENT DOCUMENTS

| | | |
|---|---|---|
| 2013/0234954 A1 | 9/2013 | Koide |
| 2013/0300722 A1* | 11/2013 | Gyouten .............. G09G 3/3648 345/204 |
| 2014/0002435 A1 | 1/2014 | Huang et al. |
| 2014/0160096 A1 | 6/2014 | Li et al. |
| 2015/0035734 A1* | 2/2015 | Lee ...................... G09G 3/3258 345/76 |
| 2015/0161956 A1* | 6/2015 | Lee ...................... H01L 27/1259 345/88 |

* cited by examiner

DEMULTIPLEXER AND DISPLAY DEVICE INCLUDING THE SAME

CROSS-REFERENCE TO RELATED APPLICATION

This application claims priority to and the benefit of Korean Patent Application No. 10-2015-0044487, filed on Mar. 30, 2015, in the Korean Intellectual Property Office, the entire content of which is incorporated herein by reference in its entirety.

BACKGROUND

1. Field

One or more aspects of embodiments of the present invention relate to a demultiplexer and a display device including the same.

2. Description of the Related Art

With the development of information technology (IT), the importance of a display device as a connection medium between a user and information is spotlighted. Accordingly, use of a display device, such as a liquid crystal display device (LCD) and/or an organic light emitting display device (OLED), is increasing.

The display device includes a data driver for supplying data signals to data lines, a scan driver for supplying scan signals to scan lines, and a plurality of pixels connected to the scan lines and the data lines.

In order to implement low power consumption and a narrow bezel, a structure in which a demultiplexer is added to output lines of the data driver has been suggested.

That is, the demultiplexer receives the data signals through the output lines of the data driver, and may time-divisionally output the data signals to the data lines, with the number of the data lines being larger than that of the output lines.

Due to a size of a transistor included in the demultiplexer, implementation of the narrow bezel may be limited.

The above information disclosed in this Background section is for enhancement of understanding of the background of the invention and therefore it may contain information that does not form prior art.

SUMMARY

According to an embodiment of the present invention, a demultiplexer includes: a first transistor connected between a data input terminal and a first output terminal; a second transistor connected between the data input terminal and a second output terminal; and a first pre-charge circuit connected to a gate electrode of the first transistor, the first pre-charge circuit including: a third transistor and a first diode connected between a first clock input terminal and the gate electrode of the first transistor in parallel; and a first capacitor connected between a second clock input terminal and the gate electrode of the first transistor.

A gate electrode of the third transistor may be connected to a third clock input terminal.

An anode electrode of the first diode may be connected to the first clock input terminal, and a cathode electrode of the first diode may be connected to the gate electrode of the first transistor.

The demultiplexer may further include a second pre-charge circuit connected to a gate electrode of the second transistor.

The second pre-charge circuit may include: a fourth transistor and a second diode connected between a third clock input terminal and the gate electrode of the second transistor in parallel; and a second capacitor connected between a fourth clock input terminal and the gate electrode of the second transistor.

A gate electrode of the fourth transistor may be connected to the first clock input terminal.

An anode electrode of the second diode may be connected to the third clock input terminal, and a cathode electrode of the second diode may be connected to the gate electrode of the second transistor.

According to an embodiment of the present invention, a display device includes: a plurality of pixels connected to a plurality of scan lines and data lines; a scan driver configured to supply scan signals to the pixels through the scan lines; a data driver configured to output data signals; and a demultiplexer configured to receive the data signals from the data driver through a plurality of data input terminals, and to output the data signals to the data lines through a plurality of output terminals, the demultiplexer including: a first transistor connected between a data input terminal from among the date input terminals and a first output terminal from among the output terminals; a second transistor connected between the data input terminal from among the data input terminals and a second output terminal from among the output terminals; and a first pre-charge circuit connected to a gate electrode of the first transistor, the first pre-charge circuit including: a third transistor and a first diode connected between a first clock input terminal and the gate electrode of the first transistor in parallel, and a first capacitor connected between a second clock input terminal and the gate electrode of the first transistor.

A gate electrode of the third transistor may be connected to a third clock input terminal.

An anode electrode of the first diode may be connected to the first clock input terminal, and a cathode electrode of the first diode may be connected to the gate electrode of the first transistor.

The demultiplexer may further include a second pre-charge circuit connected to a gate electrode of the second transistor.

The second pre-charge circuit may include: a fourth transistor and a second diode connected between a third clock input terminal and the gate electrode of the second transistor in parallel; and a second capacitor connected between a fourth clock input terminal and the gate electrode of the second transistor.

A gate electrode of the fourth transistor may be connected to the first clock input terminal.

An anode electrode of the second diode may be connected to the third clock input terminal, and a cathode electrode of the second diode may be connected to the gate electrode of the second transistor.

The output terminals may be two times in number than that of the data input terminals.

BRIEF DESCRIPTION OF THE DRAWINGS

The above and other aspects and features of the present invention will become apparent to those skilled in the art from the following detailed description of the example embodiments with reference to the accompanying drawings.

In the drawings, the relative sizes of elements, layers, and regions may be exaggerated for clarity.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Figure 1:
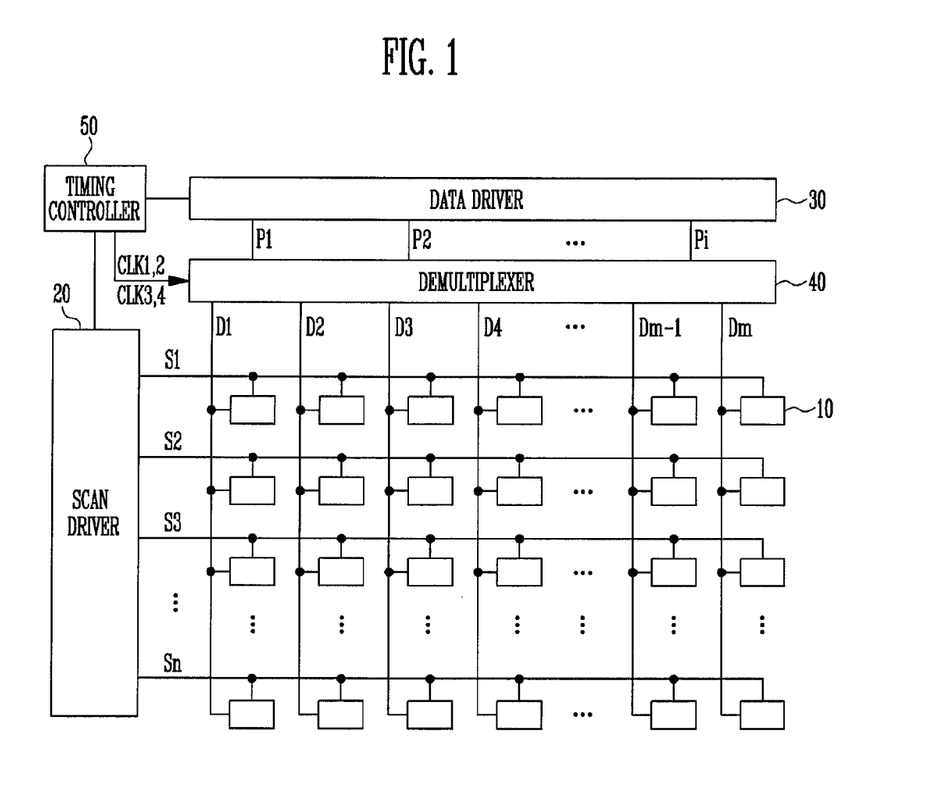
FIG. 1 is a view illustrating a display device according to an embodiment of the present invention.

FIG. 1 is a view illustrating a display device according to an embodiment of the present invention.

Referring to FIG. 1, the display device according to an embodiment of the present invention may include a plurality of pixels 10, a scan driver 20, a data driver 30, a demultiplexer 40, and a timing controller 50.

The pixels 10 may be connected to a plurality of scan lines S1 to Sn and a plurality of data lines D1 to Dm, respectively.

The scan driver 20 may supply scan signals to the pixels 10 through the scan lines S1 to Sn.

For example, the scan driver 20 generates the scan signals in accordance with control of the timing controller 50, and may sequentially output the generated scan signals to the scan lines S1 to Sn.

The data driver 30 may output data signals to output lines P1 to Pi.

For example, the data driver 30 generates the data signals in accordance with the control of the timing controller 50, and may transmit the generated data signals to the demultiplexer 40 through the output lines P1 to Pi.

The demultiplexer 40 receives the data signals from the data driver 30 and may output the data signals to the data lines D1 to Dm.

Accordingly, the demultiplexer 40 may be connected to i output lines P1 to Pi and m data lines D1 to Dm.

Here, the number of the m data lines D1 to Dm may be larger than the number of the i output lines P1 to Pi.

For example, the number of the m data lines D1 to Dm may be two times the number of the i output lines P1 to Pi.

The timing controller 50 may control the scan driver 20, the data driver 30, and the demultiplexer 40.

For example, the timing controller 50 may supply a first clock signal CLK1, a second clock signal CLK2, a third clock signal CLK3, and a fourth clock signal CLK4 to the demultiplexer 40.

Figure 2:
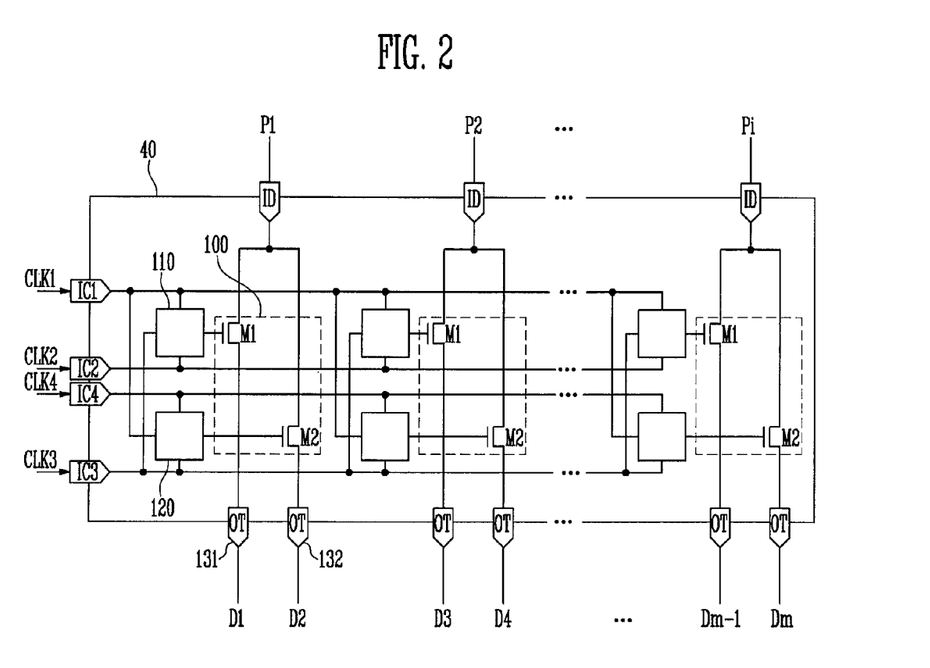
FIG. 2 is a view illustrating a demultiplexer according to an embodiment of the present invention.

FIG. 2 is a view illustrating a demultiplexer 40 according to an embodiment of the present invention.

Referring to FIG. 2, the demultiplexer 40 according to one or more embodiments may include a plurality of data input terminals ID, a plurality of output terminals OT, a first clock input terminal IC1, a second clock input terminal IC2, a third clock input terminal IC3, a fourth clock input terminal IC4, a plurality of switching units (e.g., a plurality of switching circuits) 100, a plurality of first pre-charge circuits 110, and a plurality of second pre-charge circuits 120.

The data input terminals ID of the demultiplexer 40 may be respectively connected to the output lines P1 to Pi.

In addition, the output terminals OT of the demultiplexer 40 may be respectively connected to the data lines D1 to Dm.

Therefore, the number of input terminals ID may be equal to the number of output lines P1 to Pi, and the number of output terminals OT may be equal to the number of data lines D1 to Dm.

The number of output terminals OT may be larger than the number of data input terminals ID. For example, the number of output terminals OT may be two times the number of data input terminals ID.

Each of the switching units 100 may be positioned (or located) between one data input terminal ID and two output terminals OT.

For convenience of description, one of the two output terminals OT connected to the switching unit 100 is referred to as a first output terminal 131 and the remaining one of the two output terminals OT connected to the switching unit 100 is referred to as a second output terminal 132.

That is, each of the switching units 100 may be connected to the corresponding data input terminal ID, the corresponding first output terminal 131, and the corresponding second output terminal 132.

Each of the switching units 100 may include a first transistor M1 connected between the corresponding data input terminal ID and the corresponding first output terminal 131, and a second transistor M2 connected between the corresponding data input terminal ID and the corresponding second output terminal 132.

Each of the first pre-charge circuits 110 may be connected to a gate electrode of the corresponding first transistor M1 included in each of the switching units 100.

In addition, each of the second pre-charge circuits 120 may be connected to a gate electrode of the corresponding second transistor M2 included in each of the switching units 100.

For example, a first electrode of the first transistor M1 included in each of the switching units 100 is connected to the corresponding data input terminal ID, a second electrode of the first transistor M1 included in each of the switching units 100 is connected to the corresponding first output terminal 131, and the gate electrode of the first transistor M1 included in each of the switching units 100 may be connected to the corresponding first pre-charge circuit 110.

In addition, a first electrode of the second transistor M2 included in each of the switching units 100 is connected to the corresponding data input terminal ID, a second electrode of the second transistor M2 included in each of the switching units 100 is connected to the corresponding second output terminal 132, and the gate electrode of the second transistor M2 included in each of the switching units 100 may be connected to the corresponding second pre-charge circuit 120.

Here, the first electrode is one of a source electrode and a drain electrode and the second electrode is an electrode different from the first electrode (e.g., the remaining one of the source electrode and the drain electrode). For example, when the first electrode is the drain electrode, the second electrode may be the source electrode.

The demultiplexer 40 receives the first clock signal CLK1 through the first clock input terminal IC1, receives the second clock signal CLK2 through the second clock input terminal IC2, receives the third clock signal CLK3 through the third clock input terminal IC3, and may receive the fourth clock signal CLK4 through the fourth clock input terminal IC4.

The first pre-charge circuits 110 may be electrically connected to the first clock input terminal IC1, the second clock input terminal IC2, and the third clock input terminal IC3, and may receive the first clock signal CLK1, the second clock signal CLK2, and the third clock signal CLK3.

In addition, the second pre-charge circuits 120 may be electrically connected to the first clock input terminal IC1, the third clock input terminal IC3, and the fourth clock input terminal IC4, and may receive the first clock signal CLK1, the third clock signal CLK3, and the fourth clock signal CLK4.

The first clock signal CLK1, the second clock signal CLK2, the third clock signal CLK3, and the fourth clock signal CLK4 may be supplied by the timing controller 50.

In FIG. 2, each of the switching units 100 are illustrated as being connected to a corresponding one of the first pre-charge circuits 110 and a corresponding one of the second pre-charge circuits 120. However, the present invention is not limited thereto, and in some embodiments, some of the first and second pre-charge circuits 110 and 120 may be omitted (e.g., refer to FIG. 5).

Figure 3:
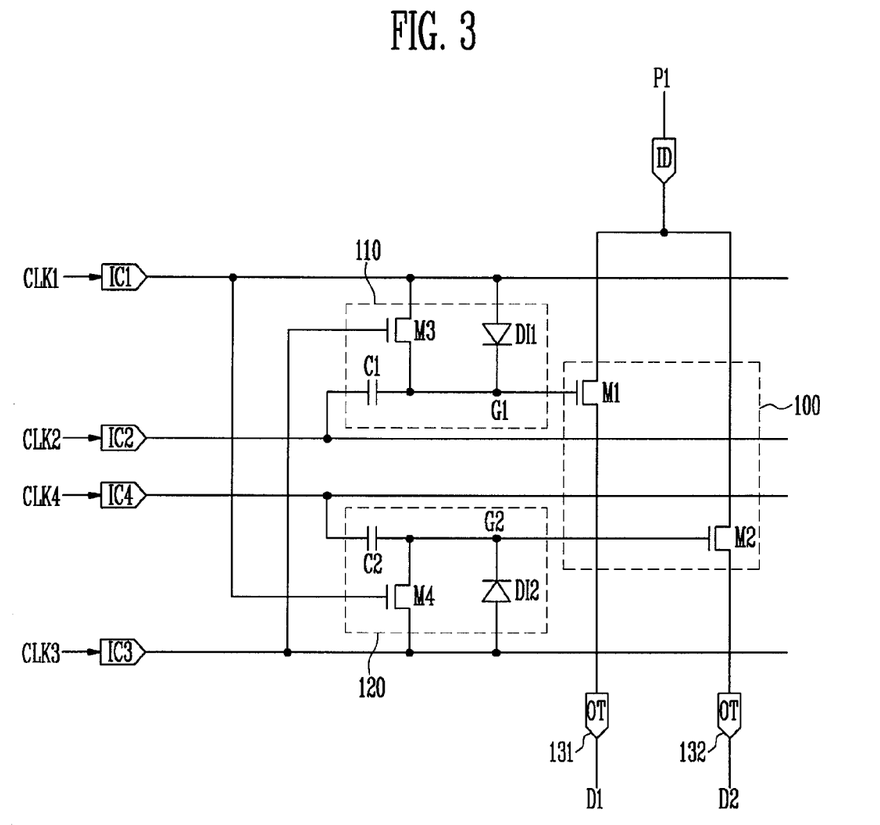
FIG. 3 is a view illustrating pre-charge circuits and a switching unit according to an embodiment of the present invention.

FIG. 3 is a view illustrating pre-charge circuits 110 and 120 and a switching unit (e.g., a switching circuit) 100 according to an embodiment of the present invention.

Referring to FIG. 3, the first pre-charge circuit 110 according to one or more embodiments of the present invention may include a third transistor M3, a first diode D11, and a first capacitor C1.

The third transistor M3 may be connected between the first clock input terminal IC1 and the gate electrode of the first transistor M1.

For example, a first electrode of the third transistor M3 is connected to the first clock input terminal IC1, a second electrode of the third transistor M3 is connected to the gate electrode of the first transistor M1, and a gate electrode of the third transistor M3 may be connected to the third clock input terminal IC3.

The first diode DI1 may be connected between the first clock input terminal IC1 and the gate electrode of the first transistor M1, similar to that of the third transistor M3.

Therefore, the third transistor M3 and the first diode DI1 may form a parallel relationship (e.g., be connected to each other in parallel).

For example, an anode electrode of the first diode DI1 may be connected to the first clock input terminal IC1 and a cathode electrode of the first diode DI1 may be connected to the gate electrode of the first transistor M1.

The first capacitor C1 may be connected between the second clock input terminal IC2 and the gate electrode of the first transistor M1.

For example, a first electrode of the first capacitor C1 is connected to the second clock input terminal IC2 and a second electrode of the first capacitor C1 is connected to the gate electrode of the first transistor M1.

Therefore, a first node G1 may be a node commonly connected to the gate electrode of the first transistor M1, the second electrode of the third transistor M3, the cathode electrode of the first diode D11, and the second electrode of the first capacitor C1.

In addition, the second pre-charge circuit 120 according to one or more embodiments of the present invention may include a fourth transistor M4, a second diode D12, and a second capacitor C2.

The fourth transistor M4 may be connected between the third clock input terminal IC3 and the gate electrode of the second transistor M2.

For example, a first electrode of the fourth transistor M4 is connected to the third clock input terminal IC3, a second electrode of the fourth transistor M4 is connected to the gate electrode of the second transistor M2, and a gate electrode of the fourth transistor M4 may be connected to the first clock input terminal IC1.

The second diode D12 may be connected between the third clock input terminal IC3 and the gate electrode of the second transistor M2, similar to that of the fourth transistor M4.

Therefore, the fourth transistor M4 and the second diode DI2 may form a parallel relationship (e.g., be connected to each other in parallel).

For example, an anode electrode of the second diode DI2 may be connected to the third clock input terminal IC3 and a cathode electrode of the second diode D12 may be connected to the gate electrode of the second transistor M2.

The second capacitor C2 may be connected between the fourth clock input terminal IC4 and the gate electrode of the second transistor M2.

For example, a first electrode of the second capacitor C2 is connected to the fourth clock input terminal IC4 and a second electrode of the second capacitor C2 is connected to the gate electrode of the second transistor M2.

Therefore, a second node G2 may be a node commonly connected to the gate electrode of the second transistor M2, the second electrode of the fourth transistor M4, the cathode electrode of the second diode DI2, and the second electrode of the second capacitor C2.

Figure 4:
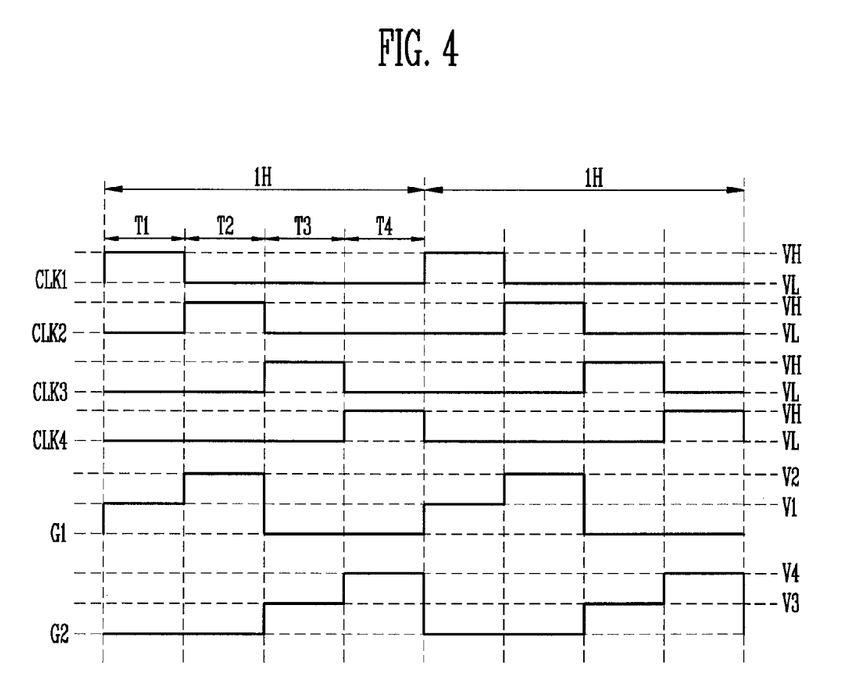
FIG. 4 is a waveform diagram illustrating an operation of a demultiplexer according to an embodiment of the present invention.

FIG. 4 is a waveform diagram illustrating an operation of a demultiplexer 40 according to an embodiment of the present invention.

Referring to FIG. 4, the operation of the demultiplexer 40 according to one or more embodiments of the present invention during a first horizontal period 1H will be described.

The first horizontal period 1H may include a first period T1, a second period T2, a third period T3, and a fourth period T4.

During the first period T1, the first clock signal CLK1 may have a high level voltage VH.

In addition, during the first period T1, the remaining clock signals CLK2, CLK3, and CLK4 may have low level voltages VL.

Therefore, the first node G1 may be pre-charged to have a first voltage V1 through the first diode DI1 included in the first pre-charge circuit 110.

At this time, the first voltage V1 may have a value obtained by subtracting a threshold voltage of the first diode DI1 from the high level voltage VH of the first clock signal CLK1.

In addition, the fourth transistor M4 may be turned on by the high level voltage VH of the first clock signal CLK1.

Therefore, during the first period T1, the low level voltage VL of the third clock signal CLK3 may be supplied to the second node G2.

Therefore, the second transistor M2 included in the switching unit 100 may maintain an off state.

During the second period T2, the second clock signal CLK2 may have a high level voltage VH.

In addition, during the second period T2, the remaining clock signals CLK2, CLK3, and CLK4 may have low level voltages VL.

Therefore, a voltage of the first node G1 may be raised (e.g., boosted) to a second voltage V2 through the first capacitor C1 included in the first pre-charge circuit 110.

At this time, the second voltage V2 may have a value obtained by adding a voltage change amount (e.g., a difference between the low level voltage VL and the high level voltage VH) of the second clock signal CLK2 to the first voltage V1.

Therefore, during the second period T2, the first transistor M1 included in the switching unit 100 may maintain an on state, and data signals input to the data input terminals ID may be output to the first output terminal 131 through the first transistor M1.

Since the demultiplexer 40 according to one or more embodiments of the present invention may supply the voltage V2 that is higher than the high level voltage VH to the gate electrode of the first transistor M1 through the first pre-charge circuit 110, the first transistor M1 may be more rapidly driven than when the high level voltage VH is supplied to the gate electrode of the first transistor M1.

Therefore, the first transistor M1 according to one or more embodiments of the present invention may have a smaller size than that of a transistor to which the high level voltage VH is supplied to the gate electrode thereof.

In addition, as the size of the first transistor M1 is reduced, a size of the demultiplexer 40 may be reduced so that a Bezel width of the display device may be also reduced.

During the third period T3, the third clock signal CLK3 may have a high level voltage VH.

In addition, during the third period T3, the remaining clock signals CLK1, CLK2, and CLK4 may have low level voltages VL.

Therefore, the second node G2 may be pre-charged to have a third voltage V3 through the second diode DI2 included in the second pre-charge circuit 120.

At this time, the third voltage V3 may have a value obtained by subtracting a threshold voltage of the second diode DI2 from the high level voltage VH of the third clock signal CLK3.

In addition, the third transistor M3 may be turned on by the high level voltage VH of the third clock signal CLK3.

Therefore, during the third period T3, the low level voltage VL of the first clock signal CLK1 may be supplied to the first node G1.

Therefore, the first transistor M1 included in the switching unit 100 may be in an off state.

During the fourth period T4, the fourth clock signal CLK4 may have a high level voltage VH.

In addition, during the fourth period T4, the remaining clock signals CLK1, CLK2, and CLK3 may have low level voltages VL.

Therefore, a voltage of the second node G2 may be raised (e.g., boosted) to a fourth voltage V4 through the second capacitor C2 included in the second pre-charge circuit 120.

At this time, the fourth voltage V4 may have a value obtained by adding a voltage change amount (e.g., a difference between the low level voltage VL and the high level voltage VH) of the fourth clock signal CLK4 to the third voltage V3.

Therefore, during the fourth period T4, the second transistor M2 included in the switching unit 100 may be in an on state, and the data signals input to the data input terminals ID may be output to the second output terminal 132 through the second transistor M2.

Since the demultiplexer 40 according to one or more embodiments of the present invention may supply the voltage V4 that is higher than the high level voltage VH to the gate electrode of the second transistor M2 through the second pre-charge circuit 120, the second transistor M2 may be more rapidly driven than when the high level voltage VH is supplied to the gate electrode of the second transistor M2.

Therefore, the second transistor M2 according to one or more embodiments of the present invention may have a size that is smaller than that of a transistor to which the high level voltage VH is supplied to the gate electrode thereof.

In addition, as the size of the second transistor M2 is reduced, a size of the demultiplexer 40 may be reduced so that the Bezel width of the display device may be also reduced.

Figure 5:
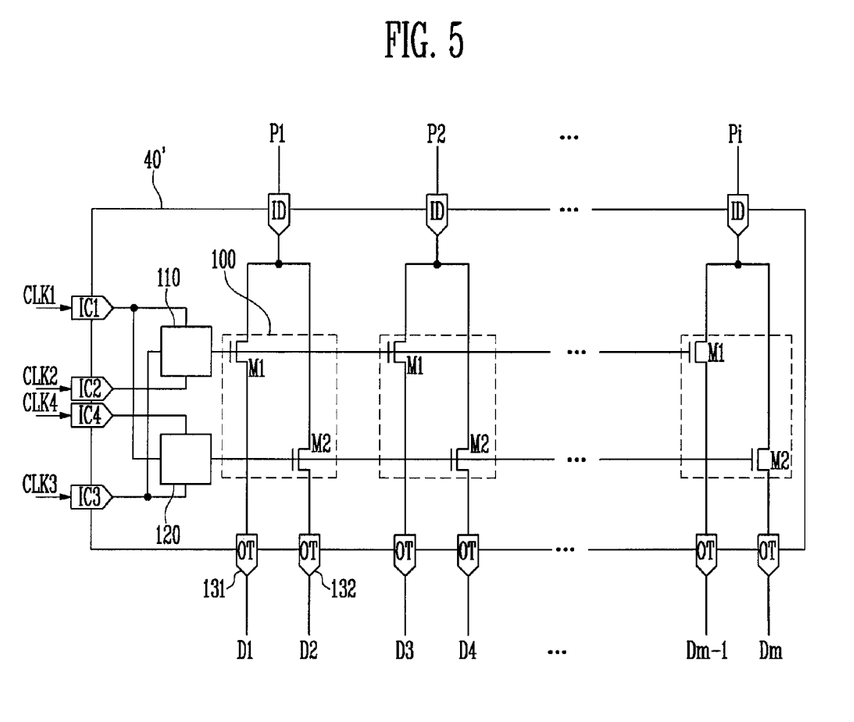
FIG. 5 is a view illustrating a demultiplexer according to another embodiment of the present invention.

FIG. 5 is a view illustrating a demultiplexer 40' according to another embodiment of the present invention.

As described above, as shown in FIG. 2, each of the switching units 100 are illustrated as being connected to a corresponding one of the first pre-charge circuits 110 and a corresponding one of the second pre-charge circuits 120. However, referring to the demultiplexer 40' illustrated in FIG. 5, some of the first and second pre-charge circuits 110 and 120 may be omitted.

For example, as shown in FIG. 5, the switching units 100 included in the demultiplexer 40' according to one or more embodiments of the present invention may share one (or more) first pre-charge circuit 110 and one (or more) second pre-charge circuit 120.

For example, the first pre-charge circuit 110 may be connected (e.g., commonly connected, concurrently connected, or simultaneously connected) to each of the gate electrodes of the plurality of first transistors M1, and the second pre-charge circuit 120 may be connected (e.g., commonly connected, concurrently connected, or simultaneously connected) to each of the gate electrodes of the plurality of second transistors M2.

In the above-described configuration with reference to FIG. 5, since the number of pre-charge circuits may be reduced, a size of the demultiplexer 40' may be reduced. Accordingly, a Bezel with a smaller width may be implemented.

As described above, according to example embodiments of the present invention, it may be possible to provide a demultiplexer capable of increasing driving speeds of the transistors included in the pre-charge circuits while allowing smaller transistors to be used, and a display device including the demultiplexer.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Example embodiments have been disclosed herein, and although specific terms are employed, they are used and are to be interpreted in a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims, and their equivalents.

What is claimed is:

1. A demultiplexer comprising:
a first transistor connected between a data input terminal and a first output terminal;
a second transistor connected between the data input terminal and a second output terminal;
a first pre-charge circuit connected to a gate electrode of the first transistor, the first pre-charge circuit comprising:
a third transistor and a first diode connected between a first clock input terminal and the gate electrode of the first transistor in parallel; and
a first capacitor connected between a second clock input terminal and the gate electrode of the first transistor; and
a second pre-charge circuit connected to a gate electrode of the second transistor, the second pre-charge circuit comprising:
a fourth transistor and a second diode connected between a third clock input terminal and the gate electrode of the second transistor in parallel; and
a second capacitor connected between a fourth clock input terminal and the gate electrode of the second transistor,
wherein a gate electrode of the third transistor is connected to the third clock input terminal.

2. The demultiplexer of claim 1,
wherein an anode electrode of the first diode is connected to the first clock input terminal, and
wherein a cathode electrode of the first diode is connected to the gate electrode of the first transistor.

3. The demultiplexer of claim 1,
wherein an anode electrode of the second diode is connected to the third clock input terminal, and
wherein a cathode electrode of the second diode is connected to the gate electrode of the second transistor.

4. The demultiplexer of claim 1, wherein respective clock signals input to the first, second, third, and fourth clock input terminals have different phases.

5. A demultiplexer comprising:
a first transistor connected between a data input terminal and a first output terminal;
a second transistor connected between the data input terminal and a second output terminal;

a first pre-charge circuit connected to a gate electrode of the first transistor, the first pre-charge circuit comprising:
   a third transistor and a first diode connected between a first clock input terminal and the gate electrode of the first transistor in parallel; and
   a first capacitor connected between a second clock input terminal and the gate electrode of the first transistor;

a second pre-charge circuit connected to a gate electrode of the second transistor, the second pre-charge circuit comprising:
   a fourth transistor and a second diode connected between a third clock input terminal and the gate electrode of the second transistor in parallel; and
   a second capacitor connected between a fourth clock input terminal and the gate electrode of the second transistor, wherein a gate electrode of the fourth transistor is connected to the first clock input terminal.

6. A display device comprising:

a plurality of pixels connected to a plurality of scan lines and data lines;

a scan driver configured to supply scan signals to the pixels through the scan lines;

a data driver configured to output data signals; and a demultiplexer configured to receive the data signals from the data driver through a plurality of data input terminals, and to output the data signals to the data lines through a plurality of output terminals, the demultiplexer comprising:
   a first transistor connected between a data input terminal from among the data input terminals and a first output terminal from among the output terminals;
   a second transistor connected between the data input terminal from among the data input terminals and a second output terminal from among the output terminals;

a first pre-charge circuit connected to a gate electrode of the first transistor, the first pre-charge circuit comprising:
   a third transistor and a first diode connected between a first clock input terminal and the gate electrode of the first transistor in parallel; and
   a first capacitor connected between a second clock input terminal and the gate electrode of the first transistor; and a second pre-charge circuit connected to a gate electrode of the second transistor, the second pre-charge circuit comprising:
   a fourth transistor and a second diode connected between a third clock input terminal and the gate electrode of the second transistor in parallel; and
   a second capacitor connected between a fourth clock input terminal and the gate electrode of the second transistor, wherein a gate electrode of the third transistor is connected to the third clock input terminal.

7. The display device of claim 6,
wherein an anode electrode of the first diode is connected to the first clock input terminal, and
wherein a cathode electrode of the first diode is connected to the gate electrode of the first transistor.

8. The display device of claim 6, wherein a gate electrode of the fourth transistor is connected to the first clock input terminal.

9. The display device of claim 6,
wherein an anode electrode of the second diode is connected to the third clock input terminal, and
wherein a cathode electrode of the second diode is connected to the gate electrode of the second transistor.

10. The display device of claim 6, wherein the output terminals are two times in number than that of the data input terminals.

11. The display device of claim 6, wherein respective clock signals input to the first, second, third, and fourth clock input terminals have different phases.

\* \* \* \* \*